United States Patent
Tanaka et al.

(10) Patent No.: US 8,427,617 B2
(45) Date of Patent: Apr. 23, 2013

(54) TRANSVERSE ELECTRIC FIELD MODE LIQUID CRYSTAL DISPLAY PANEL CAPABLE OF PREVENTING BRIGHT REGIONS OF THE CIRCUMFERENCES OF SLIT-SHAPED OPENINGS OF AN UPPER ELECTRODE

(75) Inventors: Shinichiro Tanaka, Tottori (JP); Yasuhiro Nakanishi, Tottori (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 12/533,833

(22) Filed: Jul. 31, 2009

(65) Prior Publication Data
US 2010/0079712 A1    Apr. 1, 2010

(30) Foreign Application Priority Data

Sep. 29, 2008   (JP) ................................. 2008-249785
Feb. 10, 2009   (JP) ................................. 2009-028195

(51) Int. Cl.
*G02F 1/1337*   (2006.01)
*G02F 1/1343*   (2006.01)

(52) U.S. Cl.
USPC .......................................... 349/141; 349/123

(58) Field of Classification Search .................. 349/141, 349/123
See application file for complete search history.

(56) References Cited

U.S. PATENT DOCUMENTS

| | | | |
|---|---|---|---|
| 2002/0008799 A1* | 1/2002 | Ota et al. | 349/43 |
| 2008/0068359 A1 | 3/2008 | Yoshida et al. | |
| 2009/0046234 A1* | 2/2009 | Tanaka | 349/141 |

FOREIGN PATENT DOCUMENTS

| | | |
|---|---|---|
| JP | A-2002-14374 | 1/2002 |
| JP | A-2008-70838 | 3/2008 |

* cited by examiner

*Primary Examiner* — Lauren Nguyen
(74) *Attorney, Agent, or Firm* — K&L Gates LLP

(57) ABSTRACT

A liquid crystal display panel includes a pair of substrates which are opposed to each other, and a liquid crystal layer which is interposed between the pair of substrates. One of the pair of substrates is provided with a plurality of scanning lines and a plurality of signal lines which are arranged in a matrix shape in a display area. Lower electrodes are each formed in each of sub-pixel areas partitioned by the plurality of scanning lines and the plurality of signal lines. An insulating film is formed in the display area so as to cover the lower electrodes. Upper electrodes are formed in the display area through the insulating film, and each have a plurality of slits in each of the sub-pixel area, and an alignment film which is formed on the upper electrodes and slit-shaped openings close to the liquid crystal layer.

6 Claims, 7 Drawing Sheets

TRANSVERSE ELECTRIC FIELD MODE LIQUID CRYSTAL DISPLAY PANEL CAPABLE OF PREVENTING BRIGHT REGIONS OF THE CIRCUMFERENCES OF SLIT-SHAPED OPENINGS OF AN UPPER ELECTRODE

BACKGROUND

1. Technical Field

The present invention relates to a transverse electric field mode liquid crystal display panel. Specifically, the present invention relates to a transverse electric mode liquid crystal display panel in which slits of an upper electrode extends along a signal line or a scanning line.

2. Related Art

The liquid crystal display panel has been used as a display unit in numerous electronic apparatuses since the liquid crystal display panel has features such as lightness, thinness, low power consumption in comparison to a CRT (Cathode Ray Tube). The liquid crystal display panel is a device which displays an image in such a manner that a direction of liquid crystal molecules aligned in a predetermined direction by performing a rubbing process on an alignment film is changed by an electric field and an amount of transmitted light or an amount of reflected light is varied.

As a method of applying the electric field to a liquid crystal layer of the liquid crystal display panel, there are a longitudinal electric field mode and a transverse electric field mode. The longitudinal electric field mode liquid crystal display panel mainly applies an electric field oriented in a vertical direction to liquid crystal molecules by a pair of electrodes disposed with the liquid crystal layer interposed therebetween. As the longitudinal electric field mode liquid crystal display panel, there are known a TN (Twisted Nematic) mode liquid crystal display panel, a VA (Vertical Alignment) mode liquid crystal display panel, a MVA (Multi-domain Vertical Alignment) mode liquid crystal display panel, and the like. In addition, the transverse electric field mode liquid crystal display panel mainly applies an electric field oriented in a horizontal direction to liquid crystal molecules by providing a pair of electrodes so as to be insulated from each other in the inside of one of a pair of substrates disposed with a liquid crystal layer interposed therebetween. As the transverse electric field mode liquid crystal display panel, there are known an IPS (In-Plane Switching) mode liquid crystal display panel in which a pair of electrodes do not overlap with other in plan view and a FFS (Fringe Field Switching) mode liquid crystal display panel in which a pair of electrodes overlap with each other in plan view. Since the transverse electric field mode liquid crystal display panel has an advantage of realizing a wide viewing angle, the transverse electric field mode liquid crystal display panel has widely been used in recent years.

In the transverse electric field mode liquid crystal display panel, slit-shaped openings extend so as to be slightly inclined in a rubbing direction and the liquid crystal molecules rotate in the same direction. In addition, in a color display liquid crystal display panel, it is possible to reduce a variation in colors in accordance with a viewing angle by realizing a multi-domain in which an inclination angle of the slit-shaped openings is divided into two positive and negative domains. However, an electric field cannot be generated in a desired direction in both ends of the slit-shaped openings. Therefore, when the slit-shaped openings extending in different directions are separated, an aperture ratio is reduced. Accordingly, the multi-domain having a high aperture ratio is realized by connecting the slit-shaped openings extending in the different directions to each other.

In the color display liquid crystal display panel, however, three sub-pixels of R (red), G (green), and B (blue) colors are normally formed in line and each one pixel is formed by a combination of the three sub-pixels. Since each one pixel normally has a substantial square, each one sub-pixel has a vertically long rectangle. Therefore, in the FFS mode liquid crystal display panel, since an electric field cannot be formed in the desired direction in both the ends of the slit-shaped openings provided in an upper electrode, a method of reducing a reduction in the aperture ratio by disposing the slit-shaped openings to extend in a vertical direction has been considered. When the slit-shaped openings extending in the different directions are connected to each other and the slit-shaped openings are disposed to extend in the vertical direction, the slit-shaped openings have a "〈" shape (or a chevron shape).

In the color display liquid crystal display panel, when the slit-shaped opening of the sub-pixel having the vertically long rectangle is formed in the "〈" shape, an area where no slit-shaped opening exits is broadened in upper and lower portions of the sub-pixel, thereby deteriorating the aperture ratio. In order to solve this problem, a liquid crystal display panel which has a zigzag shape formed by connecting a plurality of the slit-shaped openings having the "〈" shape to each other is disclosed in FIG. 68 of JP-A-2002-14374. In addition, a liquid crystal display panel which has the "〈" shape formed by matching a signal line to the slit-shaped opening, that is, the "〈" shape bent by matching the shape of the sub-pixel in a lengthwise direction to the slit-shaped opening is disclosed in FIG. 28 of JP-A-2008-70838.

In recent years, there has been devised a FFS mode liquid crystal display panel in which a lower electrode operates as a pixel electrode and an upper electrode operates as a common electrode by forming an inter-electrode insulating film on the lower electrode and forming the upper electrode having slit-shaped openings on the surface of the inter-electrode insulating film across all the sub-pixels. Since the FFS mode liquid crystal display panel having this configuration has an advantage of considerably improving brightness and contrast, the FFS mode liquid crystal display panel has been applied to a device which includes a slit-shaped opening having the "〈" shape.

However, in this liquid crystal display panel, a way of disposing the slit-shaped opening when the slit-shaped opening having the "〈" shape extending in the same direction as that of a signal line in a light-shielding film (black matrix) of a color filter substrate is formed in the upper electrode formed across the signal lines is not taken into consideration. On the other hand, in a liquid crystal display panel in which the upper electrode having the slit-shaped opening is not formed across the signal line and the upper electrode operates as a pixel electrode, the width of the light-shielding film is equal to or larger than that of the signal line. When a color filter substrate which includes the light-shielding film having this configuration is applied to a liquid crystal display panel in which the upper electrode operates as a common electrode, and particularly, when the slit-shaped opening is formed close to the signal line in order to make the aperture ratio larger, a problem occurs in that a brightly displayed region of the circumference of the slit-shaped opening is shielded from light by the light-shielding film and thus brightness deteriorates.

SUMMARY

An advantage of some aspects of the invention is that it provides a transverse electric field mode liquid crystal display panel capable of preventing bright regions of the circumferences of slit-shaped openings of an upper electrode formed across each signal line from being shielded from light due to a light-shielding film and capable of realizing a bright display.

According to an aspect of the invention, there is provided a liquid crystal display panel including: a pair of substrates which are opposed to each other; and a liquid crystal layer which is interposed between the pair of substrates, wherein one of the pair of substrates is provided with a plurality of scanning lines and a plurality of signal lines which are arranged in a matrix shape in a display area, lower electrodes which are each formed in each of sub-pixel areas partitioned by the plurality of scanning lines and the plurality of signal lines, an insulating film which is formed in the display area so as to cover the lower electrodes, upper electrodes which are formed in the display area through the insulating film and each have a plurality of slits in each of the sub-pixel area, and an alignment film which is formed on the upper electrodes and slit-shaped openings close to the liquid crystal layer, wherein the other of the pair of substrates is provided with light-shielding films which are formed at locations overlapping with the scanning lines and the signal lines in plan view, wherein each of the upper electrodes overlaps with each of the light-shielding films in at least a partial portion in plan view, wherein each of the slit-shaped openings extends along any one of the signal line or the scanning line and has a main portion extending in an direction inclined at a predetermined angle with respect to a rubbing direction of the alignment film and a front end portion, and wherein an edge of the main portion of at least one of the slit-shaped openings formed on both sides of the light-shielding film so as to dispose the light-shielding film therebetween in plan view does not overlap with the light-shielding film disposed between the slit-shaped openings in plan view.

In the liquid crystal display panel according to this aspect of the invention, the edges of the circumferences of the slit-shaped openings do not overlap with the light-shielding film in plan view in a transverse electric field mode liquid crystal display panel in which the lower electrodes operates as a pixel electrode and the upper electrode operates as a common electrode. In the transverse electric field mode liquid crystal display panel, the vicinities of the edges of the slit-shaped openings are the brightest and regions getting away from the edges become darker at the drive time. Accordingly, in the liquid crystal display panel according to this aspect of the invention, at least one among the bright areas of the vicinities of the edges in the main portions of the slit-shaped openings of the upper electrodes formed between the signal lines can be prevented from being shielded from light by the light-shielding film. Therefore, it is possible to obtain the liquid crystal display panel realizing a bright display.

In the liquid crystal display panel according to this aspect of the invention, the edges of the main portions of the slit-shaped openings may not overlap with the light-shielding film in plan view in the slit-shaped openings formed on both the sides of the light-shielding film so as to dispose the light-shielding film therebetween in plan view.

In the liquid crystal display panel according to this aspect of the invention, the both of the bright areas of the circumferences of the slit-shaped openings of the upper electrode located on both sides of the light-shielding film are not shielded from light by the light-shielding film. Therefore, it is possible to obtain the liquid crystal display panel realizing a more bright display.

In the liquid crystal display panel according to this aspect of the invention, on the assumption that a relation of $0°<\gamma1<90°$ is satisfied and an inclination in one arbitrary direction is positive with respect to the rubbing direction, the slit-shaped opening may include a first main portion extending to be inclined at an angle $+\gamma1$ and a second main portion extending to be inclined at an angle $-\gamma1$.

In the liquid crystal display panel according to this aspect of the invention, since so-called two domains are formed in the liquid crystal display panel, it is possible to obtain the liquid crystal display panel reducing a color variation made in accordance with a viewing angle.

In the liquid crystal display panel according to this aspect of the invention, on the assumption that a relation of $\gamma1<\gamma2<90°$ is satisfied, the slit-shaped opening further may include a third main portion extending to be inclined at an angle $+\gamma2$ with respect to the rubbing direction and a fourth main portion extending to be inclined at an angle $-\gamma2$ with respect to the rubbing direction.

In the liquid crystal display panel according to this aspect of the invention, the slit-shaped openings formed in the upper electrode have the double "〈" shape. Accordingly, in the liquid crystal display panel according to this aspect of the invention, a ripple problem rarely occur when the surface of the liquid crystal display panel is pressed, as well as obtaining the advantages of those of the liquid crystal display panel.

In the liquid crystal display panel according to this aspect of the invention, on the assumption that a direction of the same inclination as that of the main portion of the slit-shaped opening is positive with respect to the rubbing direction, the front end portion of the slit-shaped opening may have a curve in which a direction of a tangent line positive and a curve in which a direction of a tangent line negative. The length of the curve in which the direction of the tangent line is negative may be shorter than the length of the curve in which the direction of the tangent line is the positive direction. At least a part of the curve in which the direction of the tangent line is negative may overlap with the light-shielding film in plan view.

A reverse twist domain where a good image display cannot be made occurs in the end portions of the slit-shaped openings. In the liquid crystal display panel according to this aspect of the invention, the length of the curve of the portion in which the reverse twist domain occurs is made shorter. Therefore, since the reverse twist domain in the end portions of the slit-shaped openings can be made narrow, it is possible to obtain the liquid crystal display panel capable of realizing a good display quality.

In the liquid crystal display panel according to this aspect of the invention, the light-shielding film and the signal line or the light-shielding film and the scanning line may extend to be parallel to the edge of the slit-shaped opening.

When the light-shielding film and the signal line extend or the light-shielding film and the scanning line extend to be parallel to the edge of the slit-shaped opening, an area which is not used to make a display is reduced, compared to a case where the light-shielding film and the signal line or the light-shielding film and the scanning line are not parallel to the edge of the slit-shaped opening. Moreover, when the light-shielding film and the signal line extend or the light-shielding film and the scanning line extend to be parallel to the edge of the slit-shaped opening, a possibility of covering the vicinity of the brightest edge of the slit-shaped opening with the light-shielding film and the signal line or the light-shielding film and the scanning line is reduced even in consideration of a manufacture error of the liquid crystal display panel. Accordingly, in the liquid crystal display panel according to this aspect of the invention, it is possible to realize a large aperture ratio, a bright display, and a small deviation in brightness.

In the liquid crystal display panel according to this aspect of the invention, than the width of the upper electrode overlapping with the light-shielding film may be twice or less larger the width of the light-shielding film.

With such a configuration, the width of the upper electrode in the formed portion of the light-shielding film can be set so as to efficiently obtain a bright display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
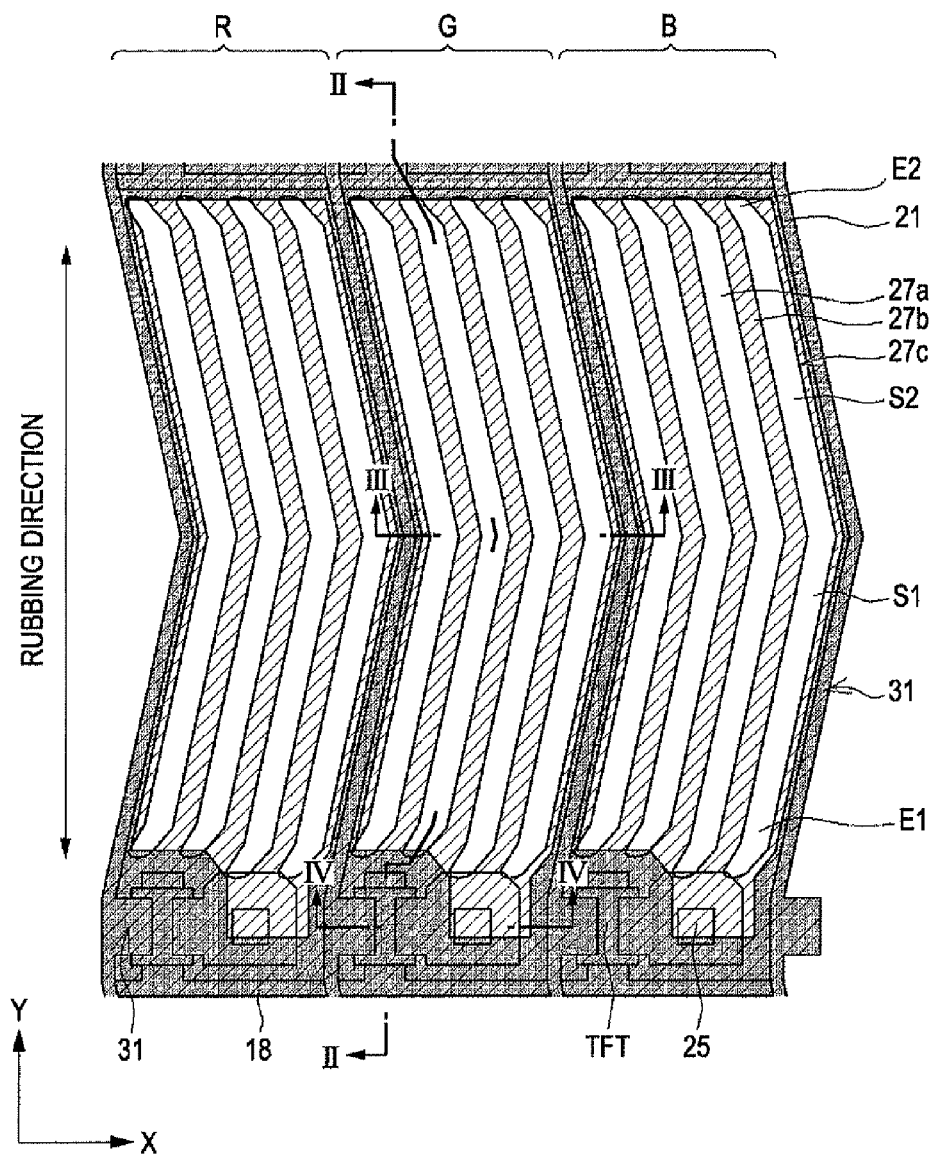
FIG. 1 is a front view illustrating three sub-pixels of a liquid crystal display panel according to a first embodiment.

Hereinafter, preferred embodiments of the invention will be described with reference to the drawings. The embodiments described below are just examples of a liquid crystal display panel for embodying a technical spirit of the invention and are not intended to limit the invention to this liquid crystal display panel. However, the invention is similarly applicable to other embodiments included in claims of the invention. In addition, in the drawings used to make description in the specification, layers and constituent elements are shown with different scales in order to allow the layers and the constituent elements to be recognizable in the drawings, and thus are not necessarily shown in proportion to the actual sizes thereof.

Figure 2:
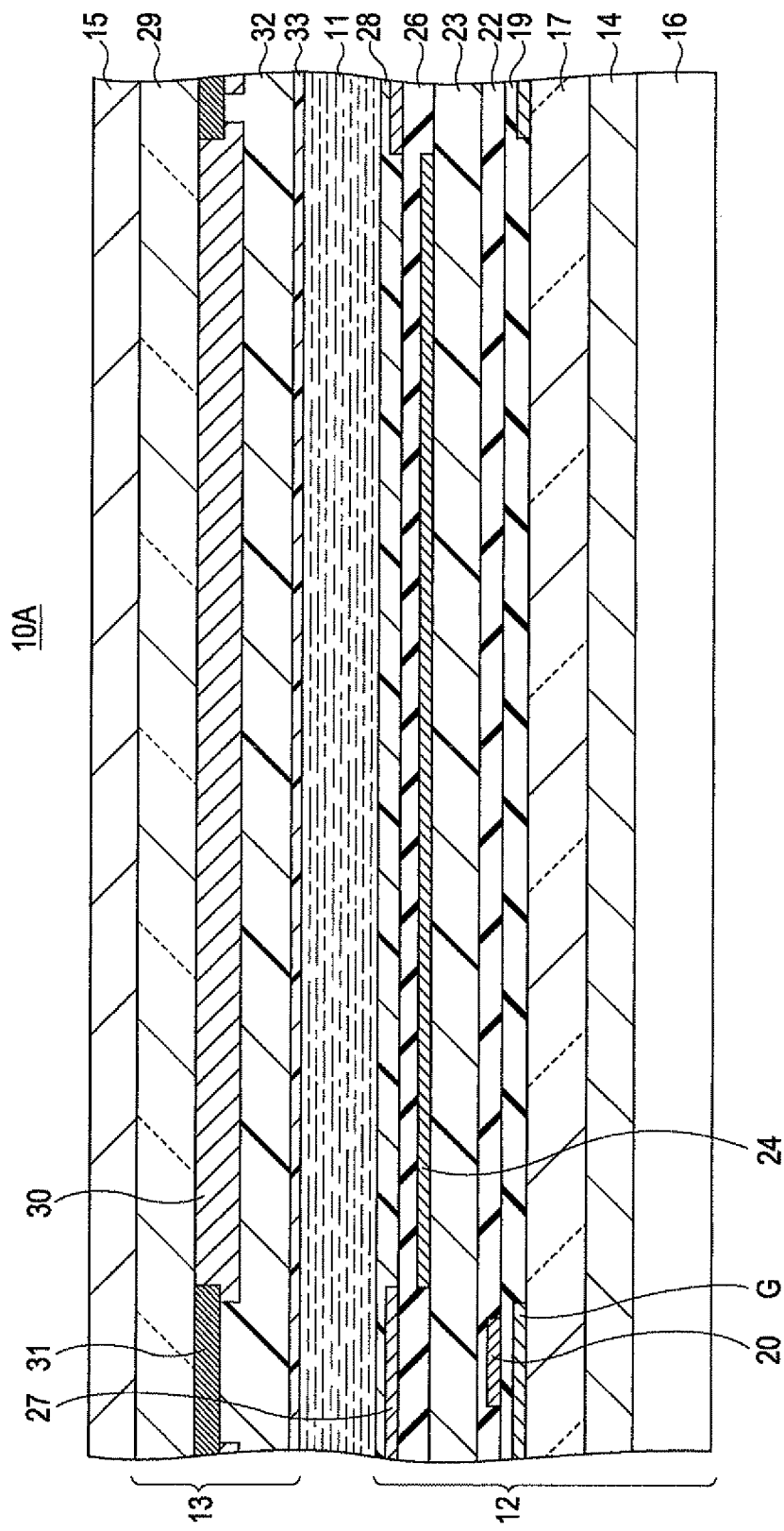
FIG. 2 is a sectional view taken along the line II-II of FIG. 1.
Figure 3:
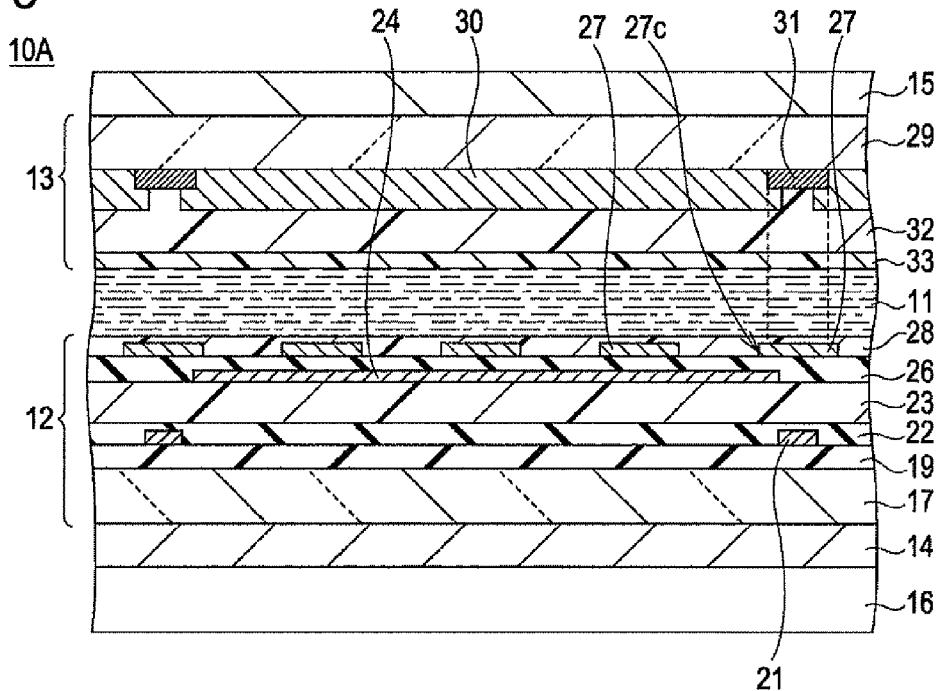
FIG. 3 is a sectional view taken along the line III-III of FIG. 1.
Figure 4:
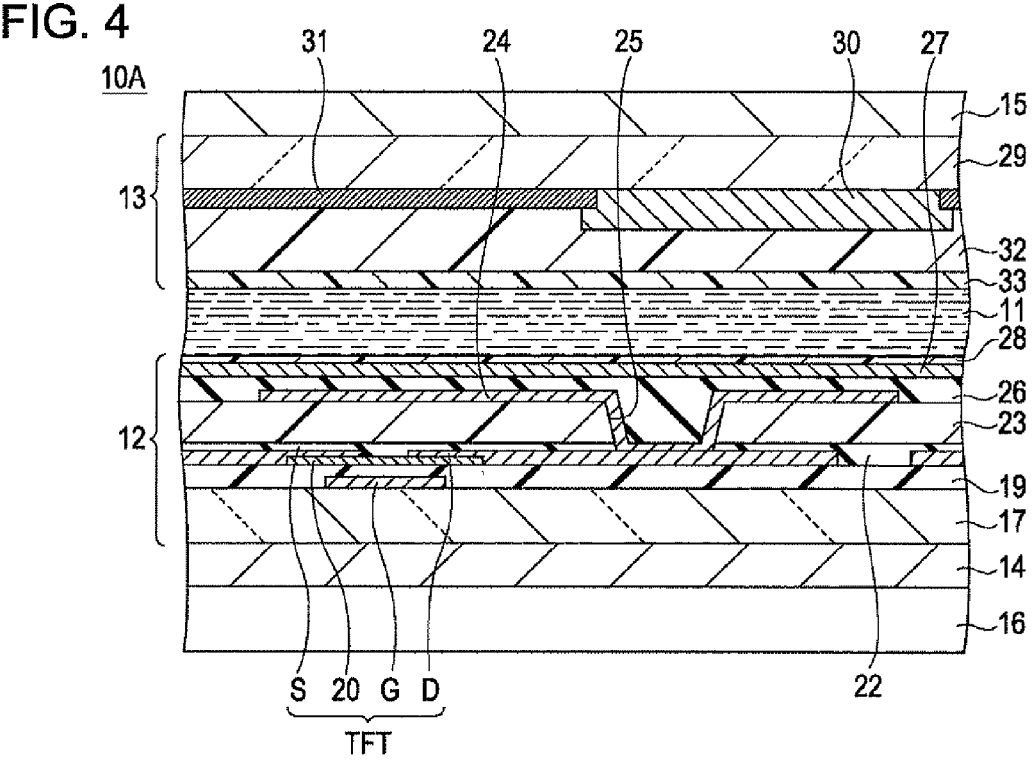
FIG. 4 is a sectional view taken along the line IV-IV of FIG. 1.
Figure 5:
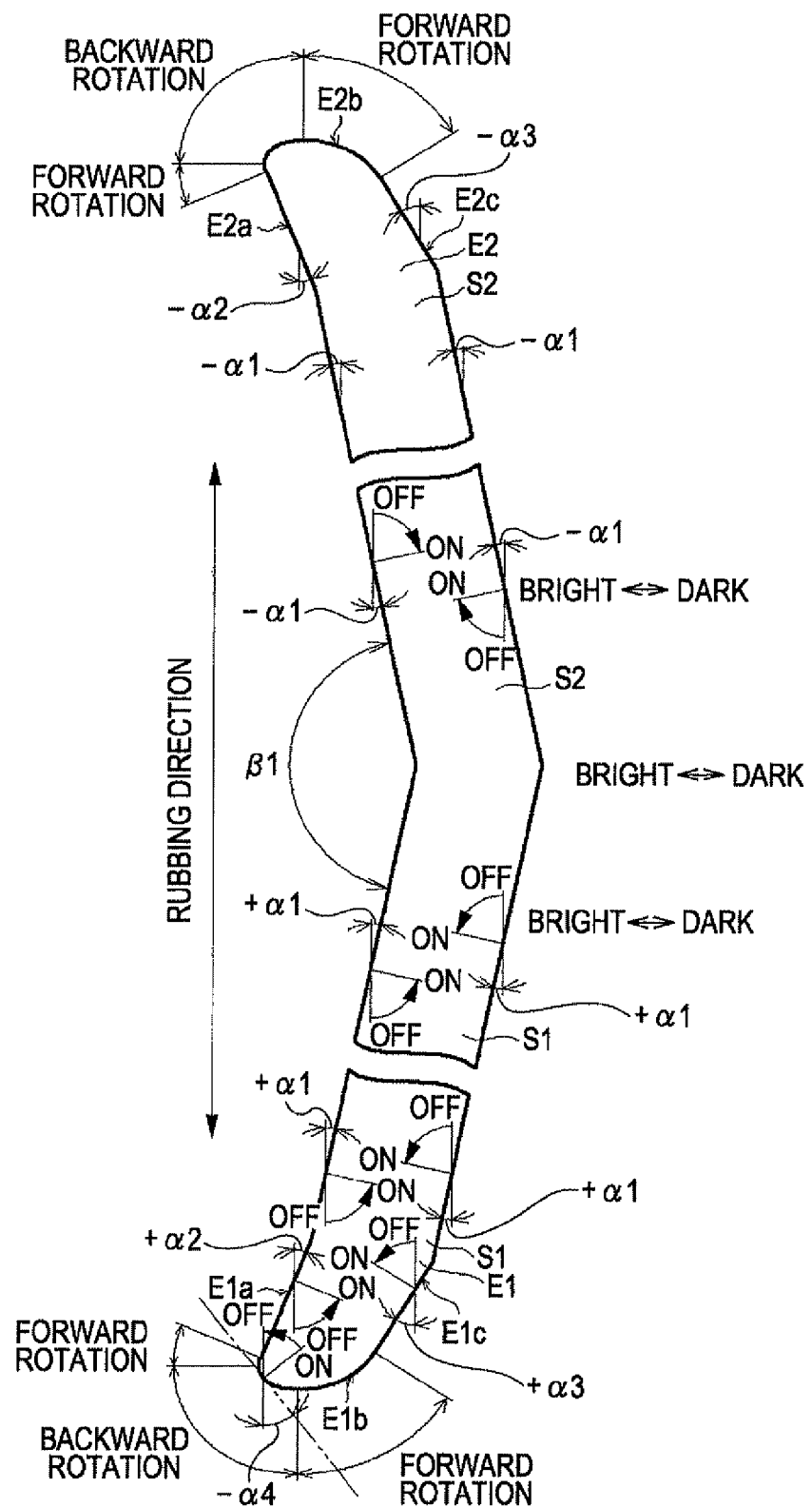
FIG. 5 is a diagram illustrating a rotation state of a liquid crystal molecule in a slit-shaped opening of the liquid crystal display panel according to the first embodiment.
Figure 7:
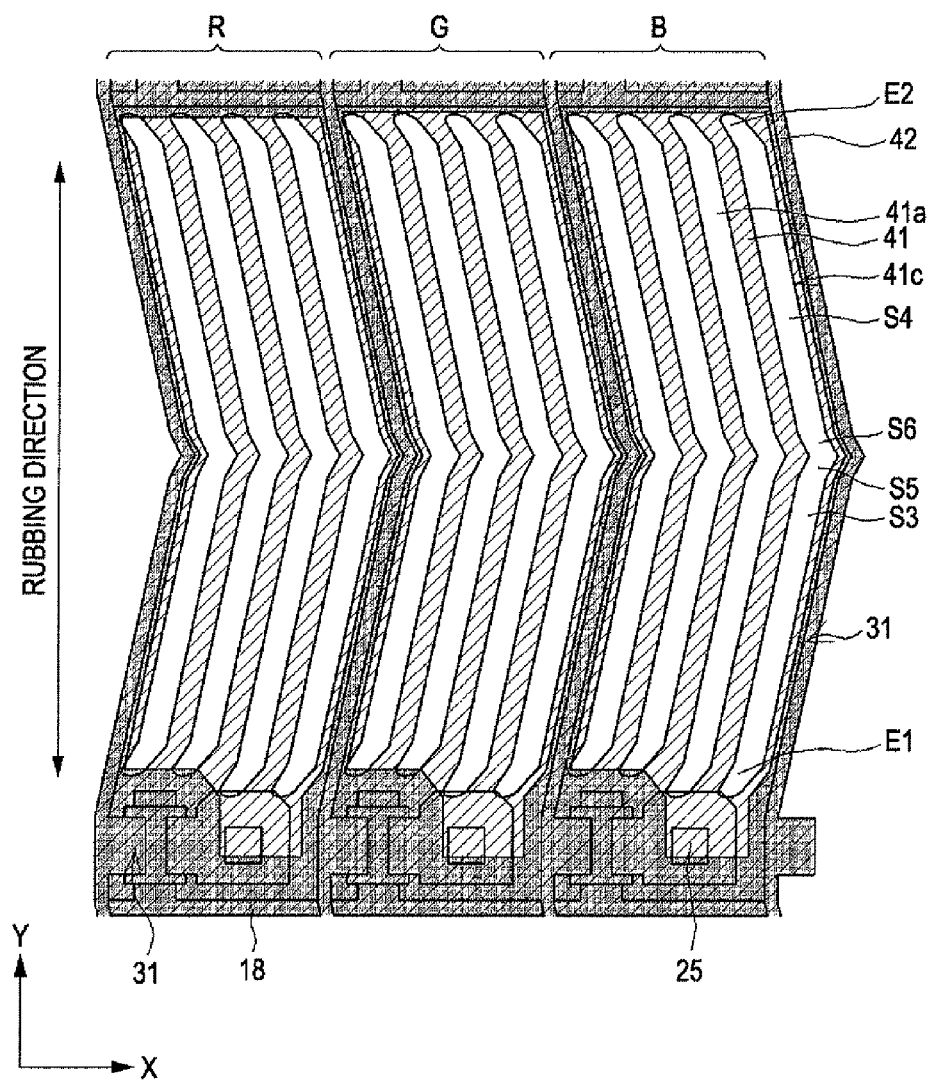
FIG. 7 is a front view illustrating three sub-pixels of a liquid crystal display panel according to a second embodiment.
Figure 8:
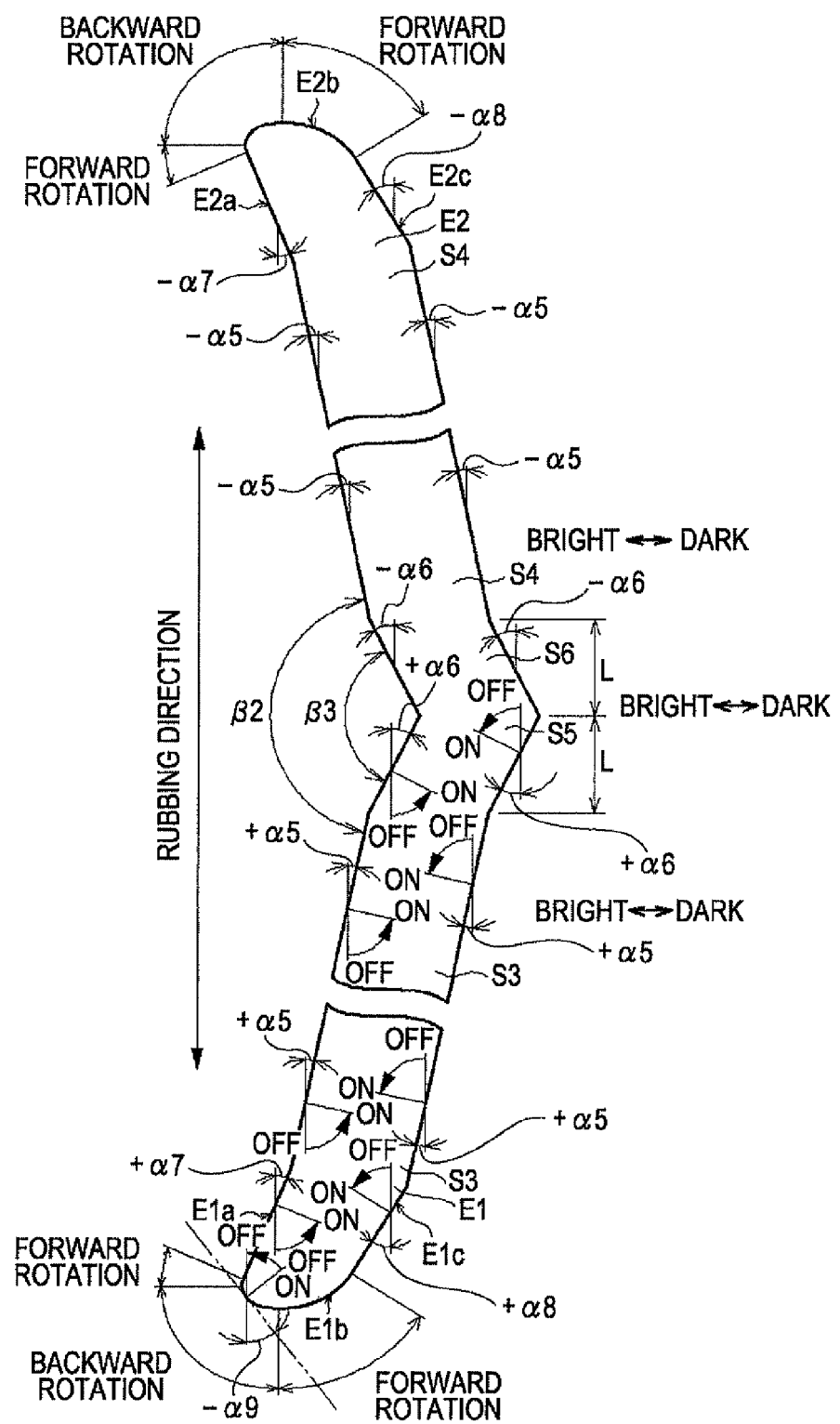
FIG. 8 is a diagram illustrating a rotation state of a liquid crystal molecule in a slit-shaped opening of the liquid crystal display panel according to the second embodiment.

FIG. 1 is a front view illustrating three sub-pixels of a liquid crystal display panel according to a first embodiment. FIG. 2 is a sectional view taken along the line II-II of FIG. 1. FIG. 3 is a sectional view taken along the line III-III of FIG. 1. FIG. 4 is a sectional view taken along the line IV-IV of FIG. 1. FIG. 5 is a diagram illustrating a rotation state of a liquid crystal molecule in a slit-shaped opening of the liquid crystal display panel according to the first embodiment. FIG. 7 is a front view illustrating three sub-pixels of a liquid crystal display panel according to a second embodiment. FIG. 8 is a diagram illustrating a rotation state of a liquid crystal mol-ecule in a slit-shaped opening of the liquid crystal display panel according to the second embodiment.

First Embodiment

A liquid crystal display panel 10A according to the first embodiment will be described with reference to FIGS. 1 to 5. The liquid crystal display panel 10A includes an array substrate 12 and a color filter substrate 13, and a liquid crystal layer 11 interposed between the array substrate 12 and the color filter substrate 13, as shown in FIGS. 2 and 3. Even though not illustrated, the thickness of the liquid crystal layer 11 is uniformly maintained by a spacer. On the rear surface of the array substrate 12, a first polarizing plate 14 is formed. On the front surface of the color filter substrate 13, a second polarizing plate 15 is formed. On the rear surface of the array substrate 12, a backlight unit 16 emitting light is disposed.

First, the configuration of the array substrate 12 will be described. The array substrate 12 includes a substrate main body 17 as a base substrate made of a material such as glass, quartz, or plastic. On a side of the substrate main body 17 of the array substrate 12 close to the liquid crystal layer 11, scanning lines 18 from which gate electrodes G are individually diverged extend in an X-axis direction of FIG. 1 and a gate insulating film 19 is formed so as to cover the gate electrodes G and the scanning lines 18. On the gate insulating film 19, individual semiconductor layers 20 formed of amorphous silicon, for example, are formed so as to be opposed to the individual gate electrodes G. In addition, a source electrode S and a drain electrode D are formed so as to partially cover each of the semiconductor layers 20. The semiconductor layer 20, the gate electrode G, the source electrode S, and the drain electrode D form a thin film transistor TFT as a switching element. The source electrode S is diverged from a signal line 21. The signal line 21 extends in a Y-axis direction of FIG. 1.

A passivation film 22 made of a material such as silicon oxide or silicon nitride is formed so as to cover the semiconductor layers 20, the sources electrodes S, and the drain electrodes D. The passivation film 22 is covered with a resin layer 23. The resin layer 23 is covered with lower electrodes 24 which are made of a transparent conductive material such as ITO (Indium Tin Oxide) or IZO (Indium Zinc Oxide) and individually formed in each of sub-pixels in an independent manner. Each of contact holes 25 which is formed through the passivation film 22 and the resin layer 23 and reaches each of the drain electrodes D. The lower electrode 24 and the drain electrode D are electrically connected to each other through the contact hole 25. With such a configuration, the lower electrode 24 operates as a pixel electrode in the liquid crystal display panel 10A according to the first embodiment.

An inter-electrode insulating film 26 made of silicon oxide or silicon nitride manufactured at a low temperature is formed so as to cover the lower electrodes 24. Upper electrodes 27 made of a transparent conductive material such as ITO or IZO are formed on the surface of the inter-electrode insulating film 26 close to the liquid crystal layer 11. The upper electrodes 27 are formed on all the sub-pixels and operate as a counter electrode. Each of the upper electrodes 27 includes a plurality of strip-shaped electrodes 27b formed by a plurality of slit-shaped openings 27a approximately extending in the Y-axis direction of FIG. 1. The slit-shaped openings 27a are formed by etching the upper electrode 27 by a photolithographic method. The inter-electrode insulating film 26 interposed between the lower electrode 24 and the upper electrode 27 becomes a dielectric film and thus forms storage capacitance between the lower electrode 24 and the upper electrode 27.

The upper electrodes 27 and the inter-electrode insulating film 26 is covered with a first alignment film 28 made of polyimide, for example. The first alignment film 28 is subjected to a rubbing process in a predetermined direction.

Next, the color filter substrate 13 will be described. The color filter substrate 13 includes a substrate main body 29 as a base substrate made of a material such as glass, quartz, or plastic. The substrate main body 29 is provided with CF (color filter) layers 30 through which different color light (for example, R, G, B, and non-color) pass in each of the sub-pixels and BM (black matrix) layers 31 made of a light-shielding material. A protective resin layer 32 is formed so as to cover the CF layers 30 and the BM layers 31. In addition, a second alignment film 33 made of polyimide, for example, is formed so as to cover the protective resin layer 32. The second alignment film 33 is subjected to a rubbing process in a direction reverse to that of the first alignment film 28.

A transmission axis of the first polarizing plate 14 of the array substrate 12 is perpendicular to a transmission axis of the second polarizing plate 15 of the color filter substrate 13. The transmission axis of the second polarizing plate 15 is parallel to the Y-axis of FIG. 1. The direction ("hereinafter, referred to as a rubbing direction") in which the first alignment film 28 is subjected to the rubbing process is parallel to the transmission axis of the second polarizing plate 15. The rubbing direction of the first alignment film 28 is a direction intersecting a main direction of an electric field generated between the upper electrode 27 and the lower electrode 24. The liquid crystal molecules aligned parallel to the rubbing direction in an initial alignment state rotate to be aligned in the main direction of the electric field by applying a voltage between the upper electrode 27 and the lower electrode 24. Bright and dark displays of the sub-pixels are made on the basis of a difference between the initial alignment state and the alignment state formed at the time of applying a voltage. In this way, a driving display of the sub-pixels is made. Even though not illustrated, the liquid crystal layer 11 is sealed in a sealing area formed by a sealing member provided between the array substrate 12 and the color filter substrate 13.

Next, the slit-shaped openings 27a of the upper electrode 27 will be described in detail with reference to FIG. 5. The slit-shaped openings 27a extend in a vertical direction (the Y-axis direction of FIG. 1). Each of the slit-shaped openings 27a includes a first end portion E1, a first main portion S1, a second main portion S2, and a second end portion E2 in communication order from a lower direction of FIG. 5. Assuming that a clockwise direction is a direction of a positive angle and an angle $\alpha 1$ is an acute angle in $0° < \alpha 1 < 90°$, the first main portion S1 extends so as to be inclined at an angle $+\alpha 1$ (for example, about 5° to about 15°) with respect to the rubbing direction and the second main portion S2 extends to be inclined so as to be inclined at an angle $-\alpha 1$ with respect to the rubbing direction. The first main portion S1 and the second main portion S2 communicate with each other and are bent at an angle $\beta 1 = 180° - \alpha 1 \times 2$ to be formed in a "く" shape (or a chevron shape), where the angle "$\alpha 1$" corresponds to an angle "$\gamma 1$" in claims.

The first end portion E1 has a first straight line portion E1a, a curve portion E1b, and a second straight line portion E1c in the communication order in its circumference. Assuming that a relation of $\alpha 1 < \alpha 2 < \alpha 3 < 90°$ is satisfied, the first straight line portion E1a extends from the inside of the "く" shape of the first main portion S1 so as to be inclined at the angle $+\alpha 2$ with respect to the rubbing direction. The second straight line portion E1c extends from the outside of the "く" shape of the first main portion S1 so as to be inclined at the angle $+\alpha 3$ with respect to the rubbing direction. Since $\alpha 2 < \alpha 3$, the first end portion E1 extends so as to have a tapered edge. The curve portion E1b is a curve connecting the first straight line portion E1a to the second straight line portion E1c. A curvature radius of the first straight line portion E1a is smaller than a curvature radius of the second straight line portion E1c.

Since the slit-shaped opening 27a has a substantially line-symmetric shape, the second end portion E2 has the similar shape as that of the first end portion E1. The first straight line portion E2a extends from the inside of the "く" shape of the second main portion 52 so as to be inclined at the angle $-\alpha 2$ with respect to the rubbing direction. The second straight line portion E2c extends from the outside of the "く" shape of the second main portion S2 so as to be inclined at the angle $-\alpha 3$ with respect to the rubbing direction. Since $\alpha 2 < \alpha 3$, the second end portion E2 extends so as to have a tapered edge. The curve portion E2b is a curve connecting the first straight line portion E2a to the second straight line portion E2c. A curvature radius of the first straight line portion E2a is smaller than a curvature radius of the second straight line portion E2c.

Here, a rotational direction of the liquid crystal molecules of the liquid crystal layer 11 in the slit-shaped openings 27a will be described. An electric field to be applied to the liquid crystal layer 11 is generated by a potential difference between the upper electrode 27 and the lower electrode 24 located in the slit-shaped openings 27a. The electric field is generated so as to be substantially parallel to the surface of the array substrate 12. A direction of the electric field in plan view is a normal line direction of the side of the slit-shaped opening 27a. When there is no potential difference between the upper electrode 27 and the lower electrode 24, that is, when the electric field is in an OFF state, an alignment direction of the liquid crystal molecules is the rubbing direction. When the electric field is in an ON state, the alignment direction of the liquid crystal molecules is the normal line direction of the side of the slit-shaped opening 27a. When the electric field is changed from the OFF state to the ON state, the liquid crystal molecules rotate in a direction in which the rotational direction is smaller. Accordingly, when the potential difference between the upper electrode 27 and the lower electrode 24 is changed from the OFF state to the ON state, the liquid crystal molecules rotate in a counterclockwise direction in the first main portion S1 and rotate in a clockwise direction in the second main portion S2, as show in FIG. 5.

In the first end portion E1, the relation of $\alpha 1 < \alpha 2 < \alpha 3$ is satisfied. Therefore, when the potential difference between the upper electrode 27 and the lower electrode 24 is changed from the OFF state to the ON state, a rotational angle of the liquid crystal molecules in the first straight line portion E1a and a rotational angle of the liquid crystal molecules in the second straight line portion E1c are smaller than a rotational angle of the liquid crystal molecules in the first main portion S1. Since the liquid crystal molecules rotate by the same potential difference, the liquid crystal molecules in the first straight line portion E1a in which the rotational angle thereof is small have a rotational force larger than that of the liquid crystal molecules in the first main portion S1. Accordingly, in the liquid crystal display panel 10A according to the first embodiment, it is easy for the liquid crystal molecules in the first straight line portion E1a to be aligned so as to maintain the location in a direction of the electric field. Therefore, even when the liquid crystal display panel is pressed from the outside and thus the alignment of the liquid crystal molecules is changed, it is easy for the liquid crystal molecules to be aligned so as to return to the location in the direction of the electric field. In addition, the same phenomenon also occurs in the first straight line portion E2a and the second straight line portion E2c of the second end portion E2.

The curve portion E1b of the first end portion E1 has an area where an angle α4 in a direction of a tangent line with respect to the rubbing direction is negative. In this area, the normal line direction of a curve with respect to the rubbing direction is a direction reverse to the normal line direction of the first main portion S1. Therefore, the liquid crystal molecules rotate in the direction reverse to that of the first main portion S1. That is, since this area becomes a reverse twist domain, a normal display cannot be made, thereby causing deterioration in an aperture ratio. The same is applied to the curve portion E2b of the second end portion E2. In the liquid crystal display panel 10A according to the first embodiment, by allowing a curvature radius to be smaller in an inside angle of the "(" shape, the length of a curve potion in which the direction of the electric field with respect to the rubbing direction is reverse to that of the first main portion S1 and the second main portion S2 is made shorter than the length of a curve portion in which the direction of the electric field is the same. Accordingly, in the liquid crystal display panel 10A according to the first embodiment, it is possible to reduce the reverse twist domain in the first end portion E1 and the second end portion E2 of the slit-shaped opening 27a.

The color sub-pixels have a vertically long shape. Therefore, when the slit-shaped openings 27a extend in a horizontal direction, the number of both ends of the slit-shaped openings 27a is increased. Accordingly, in the liquid crystal display panel 10A according to the first embodiment, a reduction in the aperture ratio is decreased by disposing the slit-shaped openings 27a to extend in the vertical direction (the Y-axis direction) and decreasing the number of the end portions of the slit-shaped openings 27a, as shown in FIG. 1.

When all the slit-shaped openings 27a are disposed in the clockwise direction or the counterclockwise direction, the liquid crystal molecules are twisted in one direction. For this reason, a phenomenon that colors are varied in accordance with a viewing angle occurs. That is because retardation is apparently varied depending on a direction of viewing the liquid crystal molecules. In order to reduce the phenomenon, the liquid crystal display panel 10A according to the first embodiment is provided with a domain where the extending direction of the slit-shaped openings 27a is inclined at the angle +α1 in the clockwise direction and a domain where the extending direction thereof is inclined at the angle −α1 in the clockwise direction. That is, there are provided the plurality of domains. In the liquid crystal display panel 10A according to the first embodiment, the two domains where the alignment direction is different from each other are provided. However, numerous domains where the alignment direction is different may be additionally provided. In the liquid crystal display panel 10A according to the first embodiment, there are provided the domain where the extending direction of the slit-shaped openings 27a is inclined at the angle +al and the domain where the extending direction thereof is inclined at the angle −α1. In this case, the angle "α1" in the angles +α1 and −α1 described above includes the completely same angle (that is, +5° and −5°, for example) and also slightly different angles such as +5° and −8° in consideration of manufacture deviation or the like. The same is applied to the angles such as α2 and α3 described in this embodiment.

In the liquid crystal display panel 10A according to the first embodiment, the domains where the alignment direction is different are formed by bending the slit-shaped openings 27a in the "(" shape. Since an area which cannot normally display an image is reduced in comparison to a case of separating the slit-shaped openings 27a by bending the slit-shaped openings 27a in the "(" shape in this manner, the aperture ratio can be made larger. Moreover, as shown in FIG. 1, the signal line 21 extends so as to be parallel to the long first main portion S1 and the long second main portion S2 of the slit-shaped opening 27a.

Next, a relation between the slit-shaped openings 27a of the upper electrode 27 and the BM layers 31 will be described. The upper electrode 27 is formed across all the sub-pixels and portions which are not illustrated by a diagonal line in FIG. 1 are the slit-shaped openings 27a of the upper electrode 27. In addition, hatched portions are the BM layers 31. As shown in FIGS. 1 and 3, the upper electrode 27 overlaps with the BM layer 31 in plan view. Circumferences 27c (edges) of all the first main portions S1 and the second main portions S2 of the slit-shaped openings 27a do not overlap with the BM layer 31 in plan view. The BM layer 31 and the signal line 21 are parallel to the first main portions S1 and the second main portions S2 of the slit-shaped openings 27a.

However, the circumferences 27c of the slit-shaped openings 27a are the brightest and regions getting away from the circumference 27c become darker. Accordingly, in the liquid crystal display panel 10 according to the first embodiment, the aperture ratio can be improved by forming the signal line 21 and the BM layer 31 so as to be parallel to the shape of the slit-shaped openings 27a, since the area which cannot display an image is reduced in comparison to a liquid crystal display panel in which the signal line is formed so as to be parallel to the Y-axis. Moreover, since the signal line 21 and the BM layer 31 extend to be parallel to the edges of the slit-shaped openings 27a, a possibility of covering the vicinities of the brightest edges of the slit-shaped openings 27a with the signal line 21 and the BM layer 31 is decreased even though a manufacture error of the liquid crystal display panel 10A is taken into consideration. In consequence, since the brightest edges of the slit-shaped openings 27a do not overlap with the BM layer 31 as a light-shielding film and thus are not shielded from light, the liquid crystal display panel 10A capable of realizing a bright display can be provided.

Figure 6A:
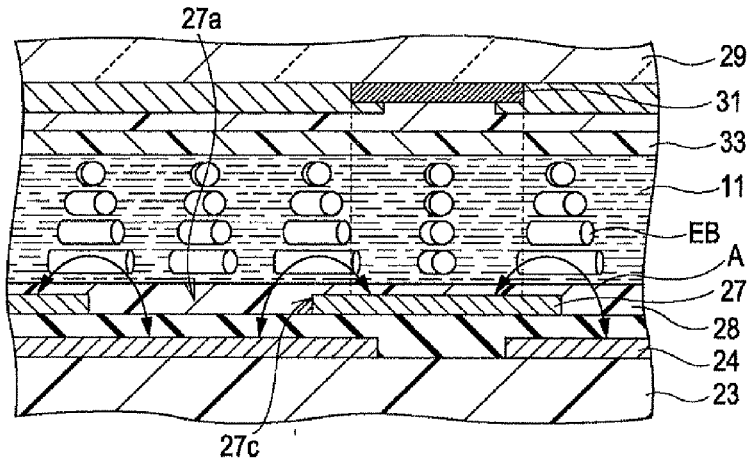
FIG. 6A is an explanatory diagram schematically illustrating an alignment state of the liquid crystal molecules in a cross-section direction of the liquid crystal molecules.
Figure 6B:
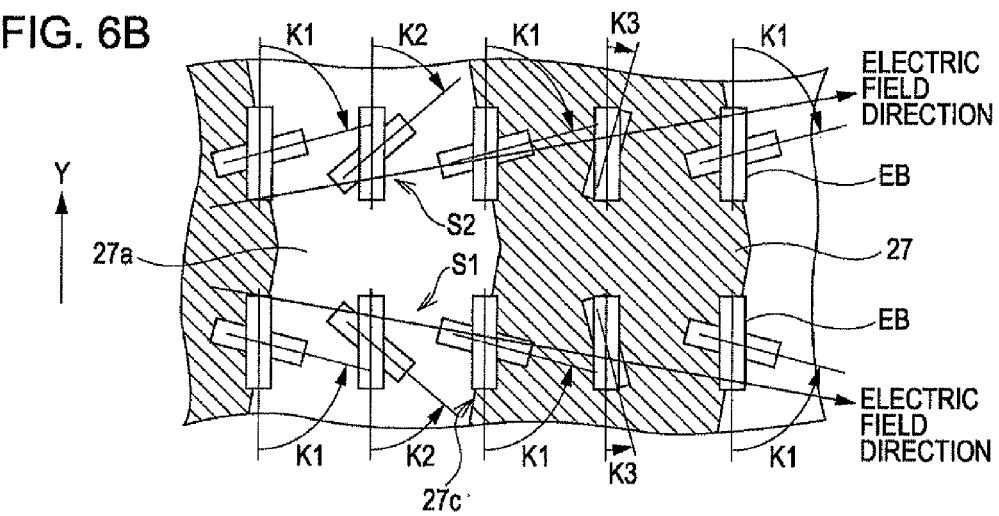
FIG. 6B is an explanatory diagram schematically illustrating a plane alignment state of the liquid crystal molecules.
Figure 6C:
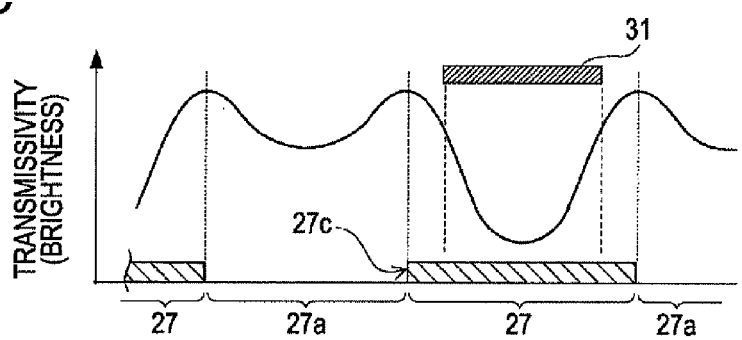
FIG. 6C is an explanatory diagram illustrating transmissivity in the alignment state of the liquid crystal molecules.

Here, the reason that the circumferences 27c (the edges) of the first main portion S1 and the second main portion S2 of the slit-shaped openings 27a formed so as not to overlap with the BM layer 31 in plan view are the brightest will be described with reference to FIG. 6. FIG. 6A is an enlarged diagram illustrating a part of the liquid crystal display panel 10A shown in FIG. 3 and an explanatory diagram schematically illustrating an alignment state of the liquid crystal molecules in a cross-section direction of the liquid crystal layer 11 when an electric field is applied to the liquid crystal layer 11. FIG. 6B is a plan view when FIG. 6A is viewed from the second alignment film 33 and an explanatory diagram schematically illustrating a plane alignment state of the liquid crystal molecules when the electric field is applied to the liquid crystal layer 11. FIG. 6C is an explanatory diagram illustrating transmissivity of the upper electrode 27, the first main portion S1 or the second main portion S2 of the slit-shaped opening 27a, and the circumference 27c (the edge) in the alignment state of the liquid crystal molecules when the electric field is applied to the liquid crystal layer 11.

As shown in FIG. 6A, the circumferences 27c of the upper electrodes 27 are disposed so as to overlap with the lower electrodes 24 in plan view. With such a configuration, in the circumferences 27c, a uniform electric field (indicated by an arrow A in the drawing) is generated in accordance with a voltage applied between the upper electrode 27 and the lower electrode 24. A horizontal-direction electric field generated along the substrate surface of the substrate main body 29 or the like is the strongest near the circumferences 27c, in that the electric field becomes stronger as a space distance between the upper electrode 27 and the lower electrode 24 is physically shorter.

In this case, as shown in FIG. 6B, liquid crystal molecules EB of the liquid crystal layer 11 respectively rotate at angles corresponding to the magnitudes of the electric field from the rubbing direction (the Y-axis direction) as the initial alignment direction to a direction which is a direction of the horizontal-direction electric field which is almost perpendicular to the extending direction of the circumferences 27c (the edges) of the first main portions S1 or the second main portions S2 of the slit-shaped openings 27a and is a direction of the horizontal-direction electric field generated in a direction oriented along the substrate surface. At this time, as described above, the transversely generated electric field is the strongest near the circumferences 27c. Accordingly, a rotational angle from the initial alignment direction (the Y-axis direction) of the liquid crystal molecules EB is indicated by the direction of the electric field or a rotational angle K1 close to the direction of the electric field near the circumferences 27c, as shown in FIG. 6B. Originally, since the horizontal-direction electric field generated near the middle of the width of the slit-shaped opening 27a and near the middle of the width of the strip-shaped electrode 27b is weak, the alignment directions of the liquid crystal molecules EB are indicated by a rotational angle K2 and a rotational angle K3 smaller than the rotational angle K1. In general, the rotational angle K2 is larger than the rotational angle K3 in many cases.

In this embodiment, however, it is configured that the transmissivity become the maximum when the direction in which the rotational angle of the liquid crystal molecules ED is the largest becomes the direction of the horizontal-direction electric field (transverse electric field) roughly generated. In consequence, as shown in FIG. 6C, the transmissivity of the liquid crystal display panel 10A has the largest value in the vicinities of the circumferences 27c where the rotational angle of the liquid crystal molecules EB is the largest and the transmissivity of the liquid crystal display panel 10A becomes smaller away from the vicinities of the circumferences 27c. Accordingly, the vicinities of the circumferences 27c are the brightest since much light transmits through the vicinities from the backlight unit and regions getting away from the circumferences 27c become darker. As described above, the BM layer 31 does not overlap with the circumferences (the edges) 27c of the brightest slit-shaped openings 27a and thus does not shield the circumferences 27c from light, as shown in FIG. 6C. Therefore, it is possible to provide the liquid crystal display panel 10A capable of realizing a bright display.

In the liquid crystal display panel 10A according to the first embodiment, parts of the end portions E1 and E2 of the slit-shaped openings 27a where the liquid crystal molecules rotate backward overlap with the BM layer 31 in plan view, as shown in FIG. 1. In this way, by shielding the portions as the reverse twist domains from light, it is possible to obtain the liquid crystal display panel 10A capable of realizing a good display quality.

In the liquid crystal display panel 10A according to the first embodiment, the circumference 27c of at least one slit-shaped opening 27a of the slit-shaped openings 27a formed on the both sides of the BM layer 31 so as to dispose the BM layer 31 therebetween in plan view may not overlap with the BM layer 31 in plan view. With such a configuration, since at least one of the bright areas of the circumferences 27c of the slit-shaped openings 27a of the upper electrode located on the both sides of the light-shielding film can be prevented from being shielded from light by the light-shielding film, it is possible to provide the liquid crystal display panel 10A capable of realizing a bright display.

In an actual liquid crystal display panel, a gap between the sub-pixels is made small to enlarge a display area of the pixels in order to realize a bright display in some cases. In this case, due to a manufacturing cause, the width of the SM layer 31 formed between the sub-pixels may be larger than the width of the upper electrode 27 overlapping with the BM layer 31. Then, it is preferable that the BM layer 31 is formed such that the circumference 27c of at least one slit-shaped opening 27a of the slit-shaped openings 27a formed on the both sides of the BM layer 31 does not overlap with the BM layer 31 in plan view so as to dispose the BM layer 31 therebetween in plan view.

In general, when the width of the BM layer 31 is formed so as to be narrower than the width of the upper electrode 27 overlapping with the BM layer 31, the BM layer 31 can be formed so as not to overlap with the circumference 27c of one slit-shaped opening 27a in plan view even in consideration of a manufacturing error of the liquid crystal display panel 10A. However, when the width of the BM layer 31 is too narrower than the width of the upper electrode 27 overlapping with the BM layer 31, that is, the width of the upper electrode 27 overlapping with the BM layer 31 is too larger than the width of the BM layer 31, a region where the transmissivity of the upper electrode 27 is lower may be increased, as known from FIG. 6C (therefore, when the width of the upper electrode 27 overlapping with the BM layer 31 is too larger than the width of the BM layer 31, forming the slit-shaped opening 27a additionally in the space is efficient in improving the transmissivity). For this reason, it is preferable that the width of the upper electrode 27 overlapping with the BM layer 31 is twice or less larger than the width of the BM layer 31. Specifically, when the width of the BM layer 31 is 6.0 µm, it is preferable that the width of the upper electrode 27 overlapping with the BM layer 31 is 12.0 µm or less and it is more preferable that the width of the upper electrode 27 approaches the width of the BM layer 31 as close as possible (for example, 6.1 µm). In this way, it is possible to realize a bright display efficiently.

Second Embodiment

A liquid crystal display panel 10B according to a second embodiment will be described with reference to FIGS. 7 and 8. A difference between the liquid crystal display panel 10A according to the first embodiment and the liquid crystal display panel 10B according to the second embodiment is that the slit-shaped opening is formed in a double "C" shape, and the remaining configuration is the same as that of the liquid crystal display panel 10A according to the first embodiment. In the liquid crystal display panel 10B according to the second embodiment, the same reference numerals are given to the same constituent elements as those of the liquid crystal display panel 10A according to the first embodiment and detailed description is omitted. If necessary, FIGS. 2 to 4 are referred.

When the slit-shaped openings 27a are connected to each other, a ripple problem occurs in that domains where alignment directions are different from each other come and go in the connection portions. The configuration of the liquid crystal display panel 10B according to the second embodiment makes it possible to reduce the ripple problem. In the liquid crystal display panel 10B according to the second embodiment, the slit-shaped openings 41a formed in the upper electrode 41 have the double "(" shape (or a chevron shape), as shown in FIGS. 7 and 8. Each of the slit-shaped openings 41a having the double "(" shape includes a first end portion E1, a first main portion S3, a third main portion S5, a fourth main portion S6, a second main portion S4, and a second end portion E2 in communication order from a lower direction of FIG. 8. Assuming that a clockwise direction is a direction of a positive angle and a relation of $0°<\alpha5<\alpha6<90°$ is satisfied, the first main portion S3 extends so as to be inclined at an angle $+\alpha5$ with respect to the rubbing direction, the second main portion S4 extends so as to be inclined at an angle $-\alpha5$ with respect to the rubbing direction, the third main portion S5 extends so as to be inclined at an angle $+\alpha6$ with respect to the rubbing direction, and the fourth main portion S3 extends so as to be inclined at an angle $-\alpha6$ with respect to the rubbing direction. The first main portion S3 and the second main portion S4 form an angle $\beta2=180°-\alpha5\times2$ and the third main portion S5 and the fourth main portion S6 form an angle $\beta3=180°-\alpha6\times2$, where the angle "$\alpha5$" and "$\alpha6$" correspond to an angle "$\gamma1$" and "$\gamma2$" in claims, respectively.

When a potential difference between the upper electrode 41 and the lower electrode 24 (see FIGS. 2 to 4) is changed from an OFF state to an ON state, a rotational angle of the third main portion S5 and the fourth main portion S6 is smaller than a rotational angle of the first main portion S3 and the second main portion S4 due to $\alpha5<\alpha6$. Since the liquid crystal molecules rotate in accordance with the same potential difference, the third main portion S5 and the fourth main portion S6 of which the rotational angle is smaller have a rotational force larger than that of the first main portion S3 and the second main portion S4. Accordingly, in the liquid crystal display panel 10B according to the second embodiment, domains where the alignment directions are different rarely come and go in the connection portion, thereby suppressing the ripple problem.

The upper electrode 41 is formed across all the sub-pixels and portions which are not illustrated by a diagonal line in FIG. 7 are the slit-shaped openings 41a of the upper electrode 41. In addition, hatched portions are the BM layers 31. As shown in FIG. 7, the upper electrode 41 overlaps with the BM layer 31 in plan view. Circumferences 41c (edges) of all the first main portions S3 to the fourth main portions S6 of the slit-shaped openings 41a do not overlap with the SM layer 31 in plan view. Since the circumferences 41c of the slit-shaped openings 41a are the brightest and regions getting away from the circumferences 41c become darker, it is possible to prevent the brightest circumferences of the slit-shaped openings 41a from being shielded from light by the BM layer 31. In addition, the BM layer 31 and the signal line 42 extend parallel to the first main portion S3 to the fourth main portion S6 of the slit-shaped openings 41a. Accordingly, in the liquid crystal display panel 10B according to the second embodiment, the same advantages as those obtained in the liquid crystal display panel 10A according to the first embodiment can be substantially obtained.

The entire disclosure of Japanese Patent Application Nos. 2008-249785, filed Sep. 29, 2008 and 2009-028195, Feb. 10, 2009 are expressly incorporated by reference herein.

What is claimed is:

1. A liquid crystal display panel comprising:
a pair of substrates which are opposed to each other; and
a liquid crystal layer which is interposed between the pair of substrates,
wherein one of the pair of substrates is provided with a plurality of scanning lines and a plurality of signal lines which are arranged in a matrix shape in a display area, lower electrodes having no-slit shaped openings which are each formed in each of sub-pixel areas partitioned by the plurality of scanning lines and the plurality of signal lines, an insulating film which is formed in the display area so as to cover the lower electrodes, upper electrodes which are formed in the display area through the insulating film and each has a plurality of slit-shaped openings in each of the sub-pixel area, and an alignment film which is formed on the upper electrodes and slit-shaped openings close to the liquid crystal layer,
wherein the other of the pair of substrates is provided with light-shielding films which are formed at locations overlapping with the scanning lines and the signal lines in plan view,
wherein at least one of the upper electrodes overlaps with at least one of the light-shielding films in at least a partial portion in plan view,
wherein at least one of the slit-shaped openings extends along any one of the signal line or the scanning line and has a first main portion extending in a direction inclined at a positive acute angle, the first main portion directly connected with a second main portion extending in a negative acute angle with respect to a rubbing direction of the alignment film and a front end portion of the first main portion, the first main portion and second main portion thus forming a continuous V shape,
wherein an edge of the main portion of at least one of the slit-shaped openings formed on both sides of the light-shielding film so as to dispose the light-shielding film therebetween in plan view does not overlap with the light-shielding film disposed between the slit-shaped openings in plan view, and
wherein the first and second main portions have end portions that include opposing straight line segments, and a curved line segment connecting the straight line segments,
wherein, a first portion of the curved line segment has a negative tangent line with respect to the rubbing direction and a first curvature radius, and a second portion of the curved line segment has a positive tangent line with respect to the rubbing direction and a second curvature radius that is larger than the first curvature radius,
wherein the length of the curved line segment in which the tangent line is negative is shorter than the length of the curved line segment in which the tangent line is positive, and
wherein at least a part of the curved line segment in which the tangent line is negative overlaps with the light-shielding film in plan view.

2. The liquid crystal display panel according to claim 1, wherein in the slit-shaped openings farmed on both the sides of the light-shielding film so as to dispose the light-shielding film therebetween in plan view, the edges of the main portions of the slit-shaped openings do not overlap with the light-shielding film in plan view.

3. The liquid crystal display panel according to claim 1, wherein, the first main portion and the second main portion form a vertex.

4. The liquid crystal display panel according to claim 3, wherein on the assumption that a relation of $\gamma1<\gamma2<90°$ is satisfied, the slit-shaped opening further includes a third main portion extending to be inclined at an angle $+\gamma2$ with respect to the rubbing direction and a fourth main portion extending to be inclined at an angle $-\gamma2$ with respect to the rubbing direction.

5. The liquid crystal display panel according to claim 1, wherein the light-shielding film and the signal line or the light-shielding film and the scanning line extend to be parallel to the edge of the slit-shaped opening.

6. The liquid crystal display panel according to claim 1, wherein the width of the upper electrode overlapping with the light-shielding film is twice or less larger than the width of the light-shielding film.

\* \* \* \* \*